(12) United States Patent  
Ahn et al.

(10) Patent No.: US 6,567,648 B1  
(45) Date of Patent: May 20, 2003

(54) SYSTEM COMBINING RADIO FREQUENCY TRANSMITTER AND RECEIVER USING CIRCULATOR AND METHOD FOR CANCELING TRANSMISSION SIGNAL THEREOF

(75) Inventors: Dal Ahn, Yongam Dongabacksan APT. 107-303, 1923 Ssangyong-dong, Chunan-si, Choongchungnam-do (KR); Jun Seok Park, Choongchungnam-do (KR); Jong Chul Park, Kyungki-do (KR); Chul Sang Yoon, Kyungki-do (KR); Won Jun Kwak, Kyungki-do (KR)

(73) Assignees: Telwave, Inc., Kyungki-Do (KR); Dal Ahn, Choongchungnam-Do (KR)

( * ) Notice: Subject to any disclaimer, the term of this patent is extended or adjusted under 35 U.S.C. 154(b) by 305 days.

(21) Appl. No.: 09/656,945

(22) Filed: Sep. 7, 2000

(30) Foreign Application Priority Data

Nov. 23, 1999 (KR) .............................. 99-52088

(51) Int. Cl.[7] .................................. H04B 1/44
(52) U.S. Cl. ........................................ 455/83; 455/84
(58) Field of Search ............................. 455/78, 80, 81, 455/82, 83, 24, 63, 278.1; 333/126, 129, 132, 134, 1.1, 24.2

(56) References Cited

U.S. PATENT DOCUMENTS

| 4,725,842 | A | * | 2/1988 | Mayberry | 342/198 |
| 5,129,099 | A | * | 7/1992 | Roberts | 455/81 |
| 5,307,514 | A | * | 4/1994 | Gagnon | 455/281 |
| 5,335,360 | A | * | 8/1994 | Marko et al. | 455/524 |
| 5,444,864 | A | * | 8/1995 | Smith | 455/84 |
| 5,701,595 | A | * | 12/1997 | Green, Jr. | 455/83 |
| 5,923,647 | A | * | 7/1999 | Dolman et al. | 370/280 |
| 6,107,898 | A | * | 8/2000 | Rauscher | 333/175 |
| 6,311,045 | B1 | * | 10/2001 | Domokos | 455/78 |
| 6,313,713 | B1 | * | 11/2001 | Ho et al. | 333/1.1 |

* cited by examiner

Primary Examiner—Thanh Cong Le  
Assistant Examiner—Tan Trinh  
(74) Attorney, Agent, or Firm—Rosenberg, Klein & Lee

(57) ABSTRACT

A transmitter/receiver combination system and a transmission signal canceling method for use in a wireless communication system using a single common antenna are provided. The system includes a circulator for receiving an original transmission signal from the transmitter, transmitting the received transmission signal to an antenna without a signal loss, and transmitting a reception signal received from the antenna to other ends without a signal loss, and a transmission signal canceller for dividing the transmission signal input in an attenuated form as much as a predetermined magnitude via the circulator together with the reception signal into two paths, producing two is phase inverted transmission signals with the same magnitude and delay time as those of the original transmission signal, and recombining the produced two transmission signals with each other, to thereby canceling the transmission signal and transmitting only the reception signal to the receiver.

20 Claims, 5 Drawing Sheets

SYSTEM COMBINING RADIO FREQUENCY TRANSMITTER AND RECEIVER USING CIRCULATOR AND METHOD FOR CANCELING TRANSMISSION SIGNAL THEREOF

BACKGROUND OF THE INVENTION

1. Field of the Invention

The present invention relates to a system for combining a transmitter and a receiver using a circulator and a method for canceling a transmission signal thereof, and more particularly, to a system for combining a transmitter and a receiver using a circulator and a method for canceling a transmission signal thereof, in which a transmission signal incoming to a receiver together with a reception signal is cancelled by generating a 180° phase inverted transmission signal with the same magnitude and delay time as those of the incoming transmission signal, to thereby improve an electrical separation degree of the transmitter and the receiver and simultaneously to reduce volume and cost thereof.

2. Description of Prior Art

In the case that a transmission/reception antenna is commonly used in various mobile communication and wireless communication base stations, relay systems or military communication devices, a conventional system for combining a transmitter and a receiver which is used for smoothly combining the transmitter and the receiver with the antenna uses an expensive component called a duplexer to combine the transmitter and the receiver, in which an electrical separation degree is sufficiently secured during combining the transmitter and the receiver owing to the electrical characteristics of the duplexer.

However, since the duplexer uses a number of dielectric resonators, an electrical loss of the duplexer is considerable. Since the transmission and reception bands are fixed in the duplexer, a pass band frequency is variable. In particular, the duplexer cannot be adapted in a secret conversation communication system which is used in a military communication device whose transmission/reception pass band is inverted frequently.

An example of a conventional transmitter/receiver combination circuit will be described in detail with reference to FIG. 1.

The conventional transmitter/receiver combination circuit uses a duplexer 1 which is connected with an antenna 3, in which a transmission band pass filter 1a and a reception band pass filter 1b for filtering a transmission signal Tx and a reception signal Rx, respectively are integrated into a single body. Here, a sufficient circuitry frequency separation feature can be obtained according to the performance of the respective band pass filters 1a and 1b of the duplexer 1.

However, since the pass bands of the transmission/reception band pass filters 1a and 1b of the duplexer 1 are fixed in the transmitter/receiver combination circuit as described above, the fixed transmission/reception band pass filters 1a and 1b of the duplexer 1 block the transmission/reception bands in the case that the pass band is successively varied and the pass band is inverted, resulting in causing the duplexer not to be used in the transmitter/receiver combination circuit. Also, since the number of stages of the resonators in each band pass filter 1a or 1b of the duplexer increases, signal loss and cost increase due to insertion of dielectric resonators into the pass band.

Figure 2:
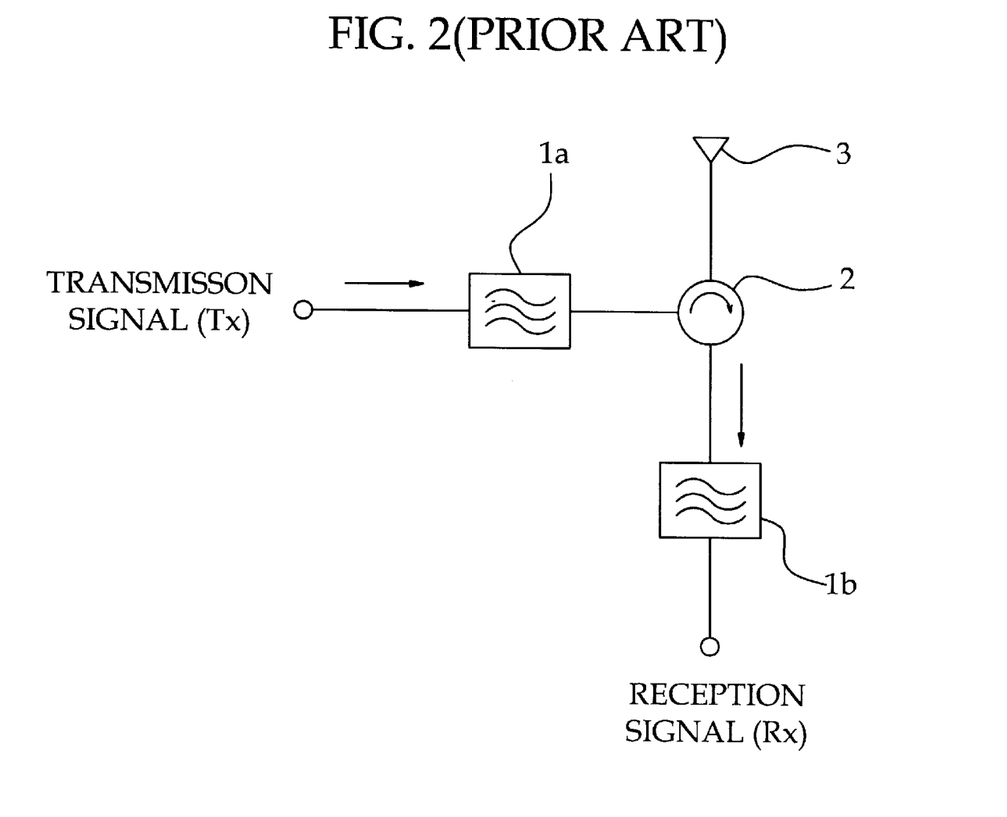
FIG. 2 is a block diagram schematically showing another conventional transmitter/receiver combination system.

Another conventional transmission/reception combination circuit shown in FIG. 2 combines a transmitter and a receiver with a circulator 2, in which an antenna 3 is connected to a first end of the circulator 2 in order to increase a separation degree and transmission and reception band pass filters 1a and 1b are connected to second and third ends, respectively.

The circulator 2 transfers a supplied signal without causing an electrical signal loss in an arrow direction of the circulator 2, but has an electrical separation feature in an opposite direction of the arrow. The circulator 2 has a separation degree of 20 dB in general.

As described above, the circulator 2 has a merit capable of securing the separation degree of about 20 dB. However, a large power amplification of a transmission signal Tx is accomplished in a power amplifier (not shown) in a transmitter, then a harmonic component due to the amplification is removed in the transmission band pass filter 1a, and then the resultant signal is emitted toward the antenna 3, while passing through the circulator 2, in which case the high power transmission signal Tx from which 20 dB or so is attenuated in the circulator 2 is input to the receiver circuit from the circulator 2 together with the reception signal Rx.

Here, if a transmission signal Tx whose signal power is relatively strong is input to a low noise amplifier (not shown) of the receiver together with a reception signal Rx, the low noise amplifier does not perform a smooth operation and is in saturation state to thereby lose performance of the amplifier.

Thus, the separation degree of the 20 dB or so is considerably insufficient in view of stability of the transmission/reception communication system.

Figure 1:
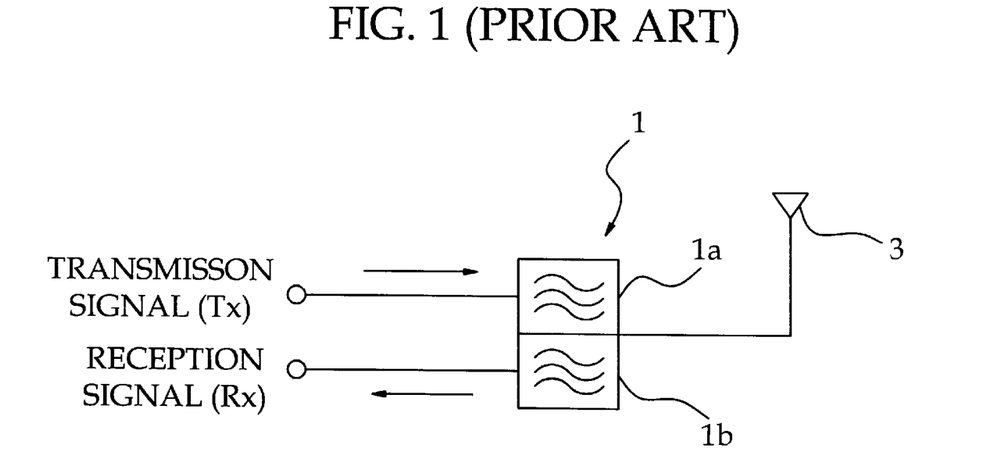
FIG. 1 is a block diagram schematically showing a conventional transmitter/receiver combination system.

Finally, the conventional FIG. 2 technology should add transmission and reception band pass filters 1a and 1b in order to supplement the insufficient frequency separation degree as in the FIG. 1 technology. In this case, since the number of stages of the resonators in each band pass filter should be increased in order to obtain a sufficient separation band, a loss in the pass band occurs.

Further, since the pass bands of the transmission and reception band pass filters are fixed, the fixed transmission/reception band pass filters 1a and 1b of the duplexer 1 block the transmission/reception bands in the case that the pass band is successively varied and the pass band is inverted, resulting in causing the duplexer not to be used in the transmitter/receiver combination circuit.

SUMMARY OF THE INVENTION

To solve the prior art problems, it is an object of the present invention to provide a system for combining a transmitter and a receiver using a circulator and a method for canceling a transmission signal thereof, in which a transmission signal incoming to a receiver together with a reception signal is cancelled by generating a 180° phase inverted transmission signal with the same magnitude and delay time as those of the incoming transmission signal, in a transmission/reception common antenna system, to thereby improve an electrical separation degree of the transmitter and the receiver, to reduce a coupling loss and simultaneously to reduce volume and cost thereof.

It is another object of the present invention to provide a system for combining a transmitter and a receiver using a circulator and a method for canceling a transmission signal thereof, in which a high power transmission signal input to the receiver is efficiently cancelled in a transmission/reception common antenna system, and thus a low power variable filter can be used, to accordingly secure a sufficient separation degree between the transmitter and the receiver although a transmission/reception frequency band such as a secret conversation communication is inverted or changed.

It is still another object of the present invention to provide a system for combining a transmitter and a receiver using a circulator and a method for canceling a transmission signal thereof, which is included in the receiver and can greatly attenuate a noise signal level of a reception band which is generated from the transmitter and input to the receiver.

To accomplish the above object of the present invention, there is provided a transmitter/receiver combination system for combining a transmitter and a receiver into a single antenna in a wireless communication system, the transmitter/receiver combination system comprising: a circulator for receiving a transmission signal from the transmitter, transmitting the received transmission signal to an antenna without causing a signal loss, and transmitting a reception signal received from the antenna to other ends without causing a signal loss; and at least one transmission signal canceller for dividing the transmission signal input in an attenuated form as much as a predetermined magnitude via the circulator together with the reception signal into at least two paths, producing two mutually phase inverted transmission signals with the same magnitude and delay time as those of the incoming transmission signal, and recombining the produced two transmission signals with each other, to thereby canceling the transmission signal and transmitting only the reception signal to the receiver.

In the present invention, the transmission signal canceller comprises: a first coupler for attenuating a part of the transmission/reception signal Tx+Rx which is input to the transmission signal canceller to branch the same and simultaneously performing a 90° phase delay; a first variable band rejection filter for canceling the reception signal Rx and passing through only a transmission signal Tx with respect to a low power transmission/reception signal Tx+Rx which has been branched via the first coupler; a signal amplifier for amplifying the transmission signal Tx of the first variable band rejection filter into the same magnitude as that of the incoming transmission signal Tx; phase delay means for delaying a time so that the transmission/reception signal Tx+Rx unbranched in the first coupler is consistent with the inverted signal of the branched transmission signal Tx; and a second coupler for 90° phase delaying the output signal of the signal amplifier additionally, and recombining the phase delayed result with the output signal Tx+Rx of the phase delay means, to thereby offset the unbranched transmission signal Tx with the phase inverted transmission signal −Tx and output only the reception signal Rx.

Also, the transmitter/receiver combination system further comprises at least one noise signal attenuation means for generating a signal together with the transmission signal from the transmitter disposed between the transmitter and the circulator and attenuating only a noise signal of a reception band input to the receiver.

According to another aspect of the present invention, a transmitter/receiver combination system comprises: at least one noise signal attenuation means connected to the output of a transmitter, for attenuating only a noise signal of a reception band generated together with a transmission signal from the transmitter; a circulator for receiving the transmission signal from the noise signal attenuation means, transmitting the received signal to an antenna without causing a signal loss, and transmitting the reception signal received from the antenna to other ends without causing a signal loss; and a first variable filter for canceling the transmission signal input in an attenuated form as much as a predetermined magnitude via the circulator together with the reception signal and transmitting only a reception signal to a receiver.

According to still another aspect of the present invention, a transmitter/receiver combination system for combining a transmitter and a receiver into a single antenna in a wireless communication system, the transmitter/receiver combination system comprising: a first circulator for receiving a transmission signal from the transmitter, transmitting the received transmission signal to a next stage without causing a signal loss; a second circulator for receiving the transmission signal from the first circulator, transmitting the received signal to an antenna without causing a signal loss, and transmitting the reception signal received from the antenna to other ends without causing a signal loss; a first pad and a second pad for receiving a first transmission signal input in an attenuated form as much as a predetermined magnitude via the other end of the first circulator and a second transmission signal input in an attenuated form as much as a predetermined magnitude via the other end of the second circulator, and for converting the first and second transmission signals into two transmission signals whose magnitudes are same and phases are inverted with each other, respectively; and signal combination means for combining the output signals of the first and second pads, canceling the first and second transmission signals and transmitting only a reception signal to the receiver.

In this case, at least one of the first and second pads comprises an attenuator for attenuating the magnitude of a transmission signal in the same magnitude as that of the other transmission signal; and phase delay means for delaying the phase of the signal in order to have a 180° phase difference with respect to the other transmission signal.

According to a further aspect of the present invention, a transmission signal canceling method in a transmitter/receiver combination system for combining a transmitter and a receiver into a single antenna in a wireless communication system, the transmission signal canceling method comprising the steps of: (a) receiving a transmission signal from the transmitter, transmitting the received transmission signal to an antenna via a first path without causing a signal loss, and transmitting a reception signal received from the antenna via a second path; (b) 90° phase delaying for delaying part of the transmission signal the reception signal input to the receiver in an attenuated form as much as a predetermined magnitude via the second path and branching the phase delayed result into a third path; (c) canceling the reception signal among the transmission signal and the reception signal which branched via the third path, and amplifying the transmission signal in the same magnitude as that of the second path; (d) delaying the transmission signal and the reception signal of the unbranched second path to have a phase difference of 180° from the transmission signal of the branched third path; and (e) combining the phase inverted transmission signal of the third path with the phase delayed transmission signal and reception signal of the second path, canceling the transmission signal Tx and transmitting only a reception signal to the receiver.

According to still a further aspect of the present invention, a transmission signal canceling method comprising the steps of: (a) transmitting a transmission signal received from the transmitter, via a first path without causing a signal loss and generating a first transmission signal which has been attenuated as much as a predetermined magnitude via a second path; (b) transmitting the received transmission signal to an antenna without causing a signal loss, and transmitting the reception signal received from the antenna to a third path without causing a signal loss; (c) receiving the first transmission signal via the second path, and a second transmission signal input in an attenuated form as much as a predetermined magnitude via the third path by the transmission signal together with the reception signal, and converting the first and second transmission signals into two transmission signals whose magnitudes are same and phases are inverted with each other; and (d) combining the outputs of the second and third paths so that the first and second transmission signals are cancelled.

As described above, the present invention offsets a transmission signal incoming to a receiver together with a reception signal is cancelled by generating a 180° phase inverted transmission signal with the same magnitude and delay time as those of the incoming transmission signal, to thereby improve a frequency separation degree of the transmitter and the receiver, reduce a coupling loss and simultaneously to reduce volume and cost thereof.

In the present invention, the transmission/reception frequency of the transmission/reception signal and the pass bands of the first through third variable filters are varied, or the transmission/reception band frequency is used in a frequency variable communication system or a secret conversation communication system, which is inverted with each other. Further, the present invention can secure a sufficient separation degree of the transmitter/receiver portion, with a result that a low power variable filter can be used.

DETAILED DESCRIPTION OF THE EMBODIMENT

Preferred embodiments of the present invention will be described in more detail with reference to the accompanying drawings.

Figure 3:
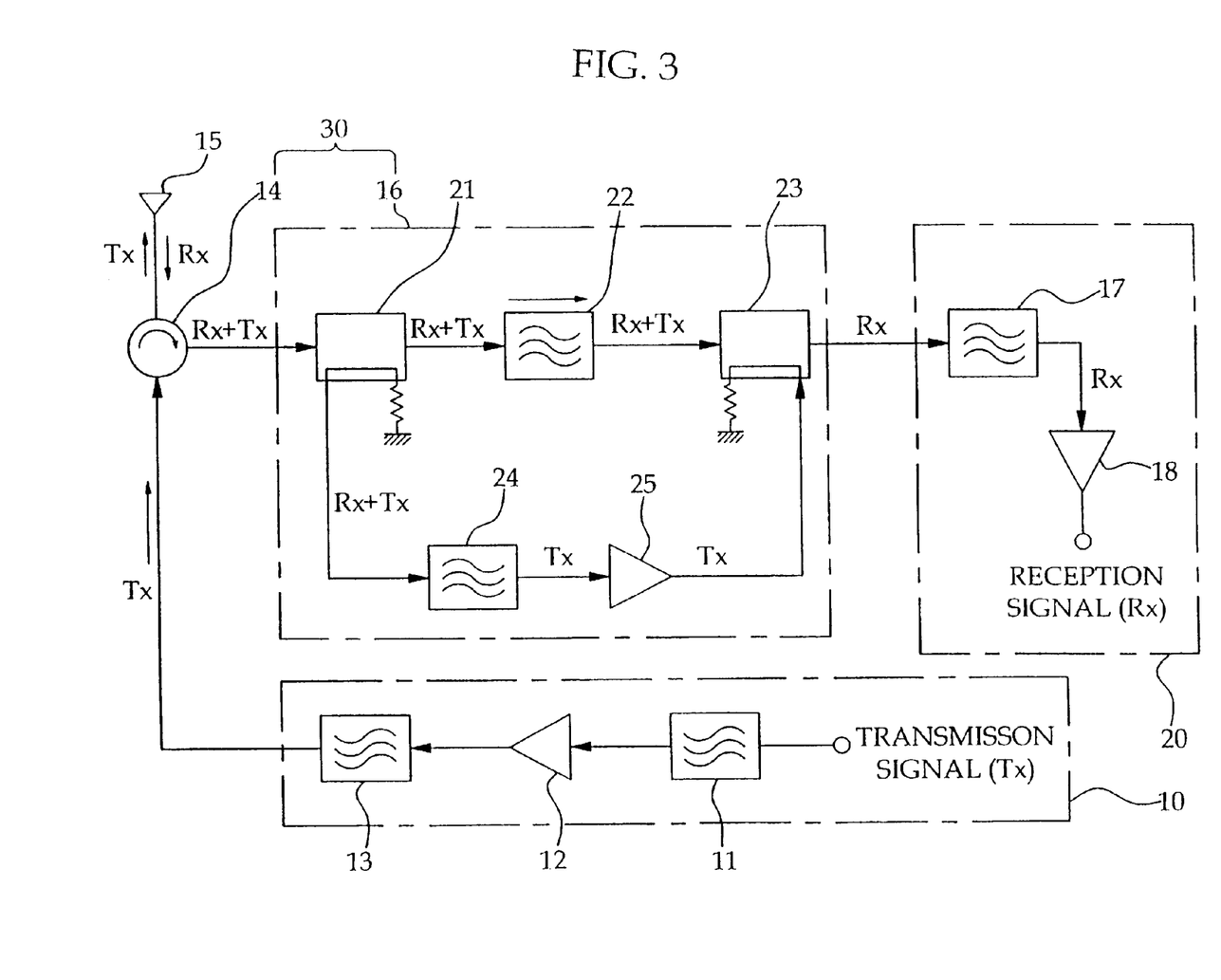
FIG. 3 is a block diagram schematically showing a RF front-end portion including a transmitter/receiver combination system using a single stage circulator according to a first embodiment of the present invention.

FIG. 3 is a block diagram schematically showing a RF front-end portion including a transmitter/receiver combination system using a single stage circulator according to a first embodiment of the present invention.

Referring to FIG. 3, a transmitter/receiver combination system 30 using a single stage circulator according to a first embodiment of the present invention, plays a role of combining a transmitter 10 processing a transmission signal Tx and a receiver 20 processing a reception signal Rx, with a common antenna 15.

The transmitter 10 includes a first variable filter 11 for varying a pass band of a transmission signal Tx by several thousand number of times per second and transferring the varied result to a next stage, a power amplifier 12 for large-scale power amplifying the output of the first variable filter 11, and a harmonic filter 13 for removing a harmonic component included in a power-amplified transmission signal.

The large-scale power amplified transmission signal Tx passes through the circulator 14 and is irradiated in the air through a transmission/reception common antenna 15 without causing any loss.

Also, the transmitter/receiver combination system 30 according to a first embodiment includes the circulator 14 and a canceller 16 for canceling a high power transmission signal Tx which is input to the receiver 20 via the circulator 14, in which the transmission signal Tx is mixed with the feeble reception signal Rx received in the receiver 20 via the antenna 15 and the circulator 14 together with the circulator.

Meanwhile, the receiver 20 includes a second variable filter 17 whose pass band is varied in order to remove an unnecessary wave other than the reception signal Rx, in which only the feeble reception signal Rx output from the canceller 16 becomes a pass band, and a low noise amplifier 18 for low-noise-amplifying the received feeble reception signal Rx.

The canceller 16 includes a first coupler 21 for branching a portion of a transmission/reception signal (Tx+Rx) input to the receiver 20, that is, an approximately 30 dB attenuated signal and for phase delaying the branched signal by 90°, a first variable band rejection filter 24 for rejecting the reception signal Rx and passing only the transmission signal Tx with respect to the low power transmission/reception signal (Tx+Rx) branched via the first coupler 21 and varying a rejection band frequency, a signal amplifier 25 for amplifying the transmission signal Tx from the first variable band rejection filter 24 into the same magnitude of that of the unbranched transmission signal Tx, a delay line filter 22 for making the delay time of the transmission/reception signal (Tx+Rx) unbranched in the first coupler 21 consistent with that of the branched transmission signal Tx, and a second coupler 23 for additionally phase delaying the output signal Tx of the signal amplifier 25 by 90° and recombining the phase delayed result in a main reception line, to thereby offset the high power transmission signal Tx and the 180° phase inverted transmission signal −Tx with each other, and outputting only a feeble reception signal Rx to a second variable filter 17.

In the canceller 16, the signal amplifier 25, the delay line filter 22 and the first and second couplers 21 and 23 are provided, so that the magnitude and the delay time of the signal are same and the phase thereof differs by 180° between the unbranched and delayed transmission signal Tx and the branched and recombined transmission signal Tx.

In the following the function of the first embodiment shown in FIG. 3 will be described in detail.

In the first embodiment, the pass band of the transmission signal Tx is varied several thousands of times per second in the first variable filter 11 and then the transmission signal Tx is transferred to the power amplifier 12. The power amplifier 12 amplifies the transmission signal Tx into the intensity of signal sufficient for radiating the same in the air, to then be transferred to the harmonic filter 13. The harmonic filter 13 cancels a harmonic component occurred due to the amplification and applies the result to the circulator 14. Accordingly, the transmission signal Tx passing through the circulator 14 without causing a signal loss is radiated in the air via the antenna 15.

Meanwhile, when a large power transmission signal Tx is radiated from the circulator 14 to the antennal 15, the transmission signal Tx input from the circulator 14 to the receiver 20 is still a high power transmission signal Tx, although the input transmission signal Tx is attenuated by about 20 dB in comparison with the radiated transmission signal Tx.

The transmission/reception separation degree of the above-described circulator 14 is nothing but about 20 dB. As a result, a certain phenomenon occurs, in which an approximately 20 dB attenuated transmission signal Tx is input to the receiver 20. In general, a signal received through the antenna 15 is considerably feeble. Thus, the feeble reception signal Rx and the approximately 20 dB attenuated high power transmission signal Tx are input to the receiver 20 via the circulator 14.

In the present invention, the first coupler 21 branches a portion of a transmission/reception signal (Tx+Rx) input to the receiver 20, that is, an approximately 30 dB attenuated signal and phase-delays the branched signal by 90°. The first variable band rejection filter 24 rejects the reception signal Rx and passes only the transmission signal Tx with respect to the low power transmission/reception signal (Tx+Rx) which is branched and 90° phase delayed via the first coupler 21. Then, the signal amplifier 25 amplifies the transmission signal Tx from the first variable band rejection filter 24 into the same magnitude as that of the unbranched transmission signal Tx, and transfers the amplified result to the second coupler 23. The output signal Tx of the signal amplifier 25 is combined to the second coupler 23, is secondarily phase delayed by 90° with a result that a 180° phase delay occurs in whole.

Meanwhile, the transmission/reception signal (Tx+Rx) unbranched in the first coupler 21 is branched in the delay line filter 22, delayed to have a phase difference of 180° from the recombined transmission signal Tx, and supplied to the second coupler 23.

As a result, the recombined 180° phase inverted transmission signal -Tx is mixed with the output signal Tx+Rx of the delay line filter 22. Thus, the high power two transmission signal Tx and (-Tx) are offset with each other, and only a feeble reception signal is output to the second variable filter 17.

Thus, in the first embodiment of the present invention, the second coupler 23 phase delays the second transmission signal Tx by 180°, mixed with the first transmission signal Tx and cancelled. As a result, the high power transmission signal Tx becomes considerably feeble. Accordingly, since the low power second variable filter 17 has a pass band in which only a feeble reception signal Rx is passed, an unnecessary wave other than the reception signal Rx is cancelled, and then sent to the low noise amplifier 18. The low noise amplifier 18 can amplify the clean reception signal Rx.

In a particular case such as a secret conversation communication, the first embodiment of the present invention varies the band pass frequencies of the first and second variable filters 11 and 17 installed in the transmitter/receiver 10 and 20 and the canceller 16 and the band rejection frequency of the first variable band rejection filter 24, to thereby vary the transmission/reception frequencies.

Further, the first embodiment of the present invention can be applied even in the case that the transmission/reception frequencies are inverted.

Meanwhile, a general variable filter is made of a semiconductor device, and thus it is difficult to realize it for use: as a high power. Also, since a relatively high power transmission signal Tx is input to the receiver 20 in the prior art, the variable filter cannot be used.

The present invention offsets the high power transmission signal Tx efficiently by the canceller 16 due to the insufficient separation degree of the circulator 14. Accordingly, the problem occurred in the case that the transmission/reception pass band is inverted has been solved. It is also possible to use low power variable filters 11, 17 and 24 which can be implemented relatively with ease.

Figure 4:
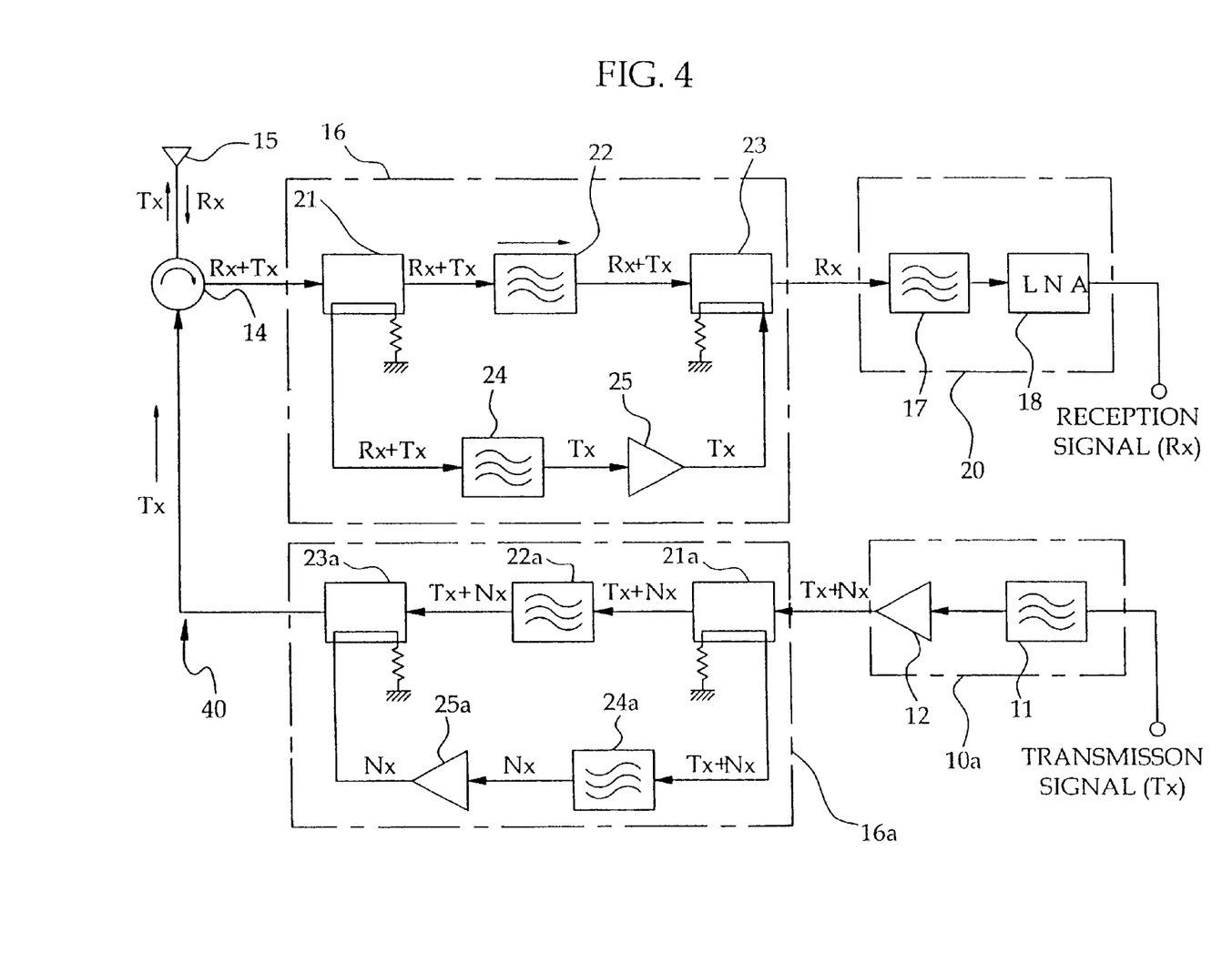
FIG. 4 is a block diagram schematically showing a RF front-end portion including a transmitter/receiver combination system using a single stage circulator according to a second embodiment of the present invention.

FIG. 4 is a block diagram schematically showing a RF front-end portion including a transmitter/receiver combination system using a single stage circulator according to a second embodiment of the present invention.

Referring to FIG. 4, a transmitter/receiver combination system 40 using a single stage circulator according to a second embodiment of the present invention, includes a second canceller 16a for efficiently attenuating a noise signal Nx amplified while passing through the power amplifier 12 in a transmitter 10a, instead of the harmonic filter 13 in the first embodiment.

Thus, the transmitter/receiver combination system 40 includes the second canceller 16a, a circulator 14, and a canceller 16, in order to greatly attenuate the component of a noise signal Nx included in the power amplified transmission signal Tx.

Also, the transmitter 10a includes a first variable filter 11 for varying the pass band of the transmission signal Tx several thousands of times per second and transferring the varied result to a next stage, and a power amplifier 12 for large power amplifying the output of the first variable filter 11.

Since the circulator 14, the canceller 16 and the receiver 20 are same as those of the first embodiment, the detailed description thereof will be omitted.

The canceller 16a includes a third coupler 21a for branching a portion of the noise signal Nx and the transmission signal Tx amplified together with the transmission signal Tx during amplifying in the power amplifier 12, that is, an approximately 30 dB attenuated signal and for phase delaying the branched signal by 90°, a second variable band rejection filter 24a for rejecting the transmission signal Tx and passing only the noise signal Nx with respect to the low power transmission/noise signal (Tx+Nx) branched via the third coupler 21a, a signal amplifier 25a for amplifying the noise signal Nx from the second variable band rejection filter 24a into the same magnitude of that of the unbranched noise signal Nx, a harmonic cancel/delay line filter 22a for delaying the transmission/noise signal Tx+Nx unbranched from the third coupler 21a to have a phase difference of 180° from the unbranched and recombined noise signal Nx and simultaneously canceling harmonic components occurred due to the power amplification, and a fourth coupler 23a for additionally phase delaying the output signal Nx of the signal amplifier 25a by 90° and recombining the phase delayed result in a main reception line, to thereby offset the high power noise signal Nx and the 180° phase inverted noise signal -Nx with each other, and thus greatly reduce a noise level and output a desired large power transmission signal Tx to the circulator 14.

In the canceller 16a, the signal amplifier 25a, the delay line filter 22a and the third and fourth couplers 21a and 23a are provided, so that the magnitude and the delay time of the signal are same and the phase thereof differs by 180° between the unbranched and delayed noise signal Nx and the branched and recombined noise signal Nx.

In the following, the operation of the second embodiment will be described with reference to the specific signal level. First, at the receiver side, the reception signal Rx received in the antenna 15 passes through the circulator 14, in which case at maximum 0.8 dB is attenuated. In the case of the first coupler 21 having a coupling loss of 20 dB, at maximum 0.2 dB is attenuated. The reception signal Rx is delayed for a predetermined time in the delay line filter 22, in which case at maximum 0.3 dB is attenuated. In the second variable filter, at maximum 3 dB is attenuated. Thus, an attenuation loss along the main reception path is 4.5 dB. The loss of about 5 dB occurs including a cable assembly loss of each element.

Here, assuming that power of the transmission signal radiated from the antenna 15 is 10 W, that is, 40 dBm at the branch of the reception side, at minimum 15 dB is attenuated due to separation of the circulator 14 and the attenuated result is transferred to the first coupler 21. Accordingly, a portion of the signal is coupled and attenuated by 20 dB and then transferred to the first variable band rejection filter 24 together with the 90° phase delay, with a result that the reception signal Rx is rejected and only the transmission signal Tx is passed. Then, the transmission signal Tx is amplified into a level of 20 W necessary for offsetting the transmission signal Tx in the signal amplifier 25 and thereafter the amplified signal is phase delayed in the 10 dB second coupler 23 by 90°, mixed and loaded in the main reception path, to thereby offset two transmission signals Tx.

Thereafter, as in the first embodiment, a clean reception signal Rx is obtained while passing through the second variable filter 17 and the low noise filter 18.

Meanwhile, at the transmission side, the transmission signal Tx is filtered in the first variable filter 11, by use of only the transmission signal Tx, and amplified as 20 W, that is, 43 dBm in the power amplifier 12 together with the not-yet-filtered noise signal Nx. The amplified signal is attenuated by 0.2 dB in the third coupler 21a having a coupling loss of 20 dB, and transferred to the harmonic cancel/delay line filter 22a, to thereby remove a harmonic component due to the power amplification and simultaneously delay a predetermined time. Here, the output signal of the harmonic cancel/delay line filter 22a is supplied to the 10 dB fourth coupler 23a to accomplish 0.6 dB attenuation. Then, 0.8 dB is attenuated while passing through the circulator 14 and then a transmission output of 10 W, that is, 40 dBm is radiated via the antenna 15. Thus, an attenuation loss along the main transmission path is 1.9 dB and a loss of about 3 dB occurs including a cable assembly loss.

Also, at the branch of the transmission side, a portion of the signal which has been attenuated by 20 dB together with the 90° phase delay in the 20 dB third coupler 21a is branched in order to lower a noise signal level of the reception band by 75 dBm at the output end of the power amplifier 12. The second variable band rejection filter 24a rejects the transmission signal Tx and passes only the noise signal Nx. Then, an approximately 35 dB low noise gain amplification is performed in the signal amplifier 25a. Thereafter, the output signal of the signal amplifier 25a is phase delayed by 90° again in the 10 dB fourth coupler 23a, mixed and loaded in the main transmission path, to thereby effect an attenuation of the noise signal Nx in the reception band more than 40 dB according to the 180° phase difference.

Thus, the transmission signal Tx passes through the circulator 14 to effect an attenuation of 15 dB or more and then is input to the reception side. As a result, since the second embodiment performs a signal processing at the reception side in the state where the noise signal Nx of 40 dB or more has been attenuated, when compared with the first embodiment. Therefore, the second embodiment can obtain the reception signal Rx having a much higher separation degree.

In a particular case such as a secret conversation communication, the second embodiment of the present invention varies the band pass frequencies of the first and second variable filters 11 and 17 installed in the transmitter/receiver 10 and 20 and the cancellers 16 and 16a and the band rejection frequencies of the first and second variable band rejection filters 24 and 24a, to thereby vary the transmission/reception frequencies. Further, the second embodiment of the present invention can be applied even in the case that the transmission/reception frequencies are inverted.

Figure 5:
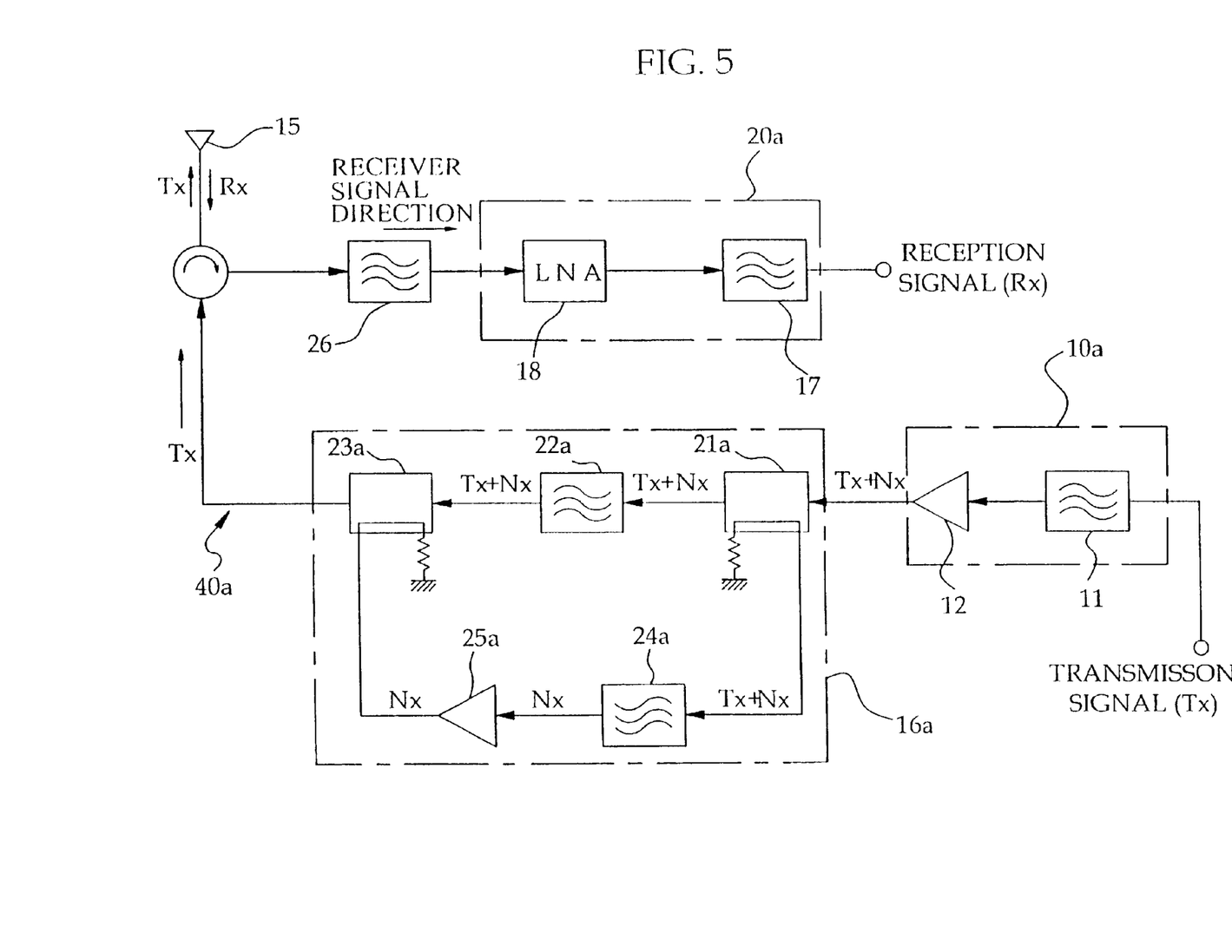
FIG. 5 is a block diagram schematically showing a RF front-end portion including a transmitter/receiver combination system using a single stage circulator according to a third embodiment of the present invention.

FIG. 5 is a block diagram schematically showing a RF front-end portion including a transmitter/receiver combination system using a single stage circulator according to a third embodiment of the present invention.

Referring to FIG. 5, the third embodiment of the present invention does not use a canceller 16 in the transmitter/receiver combination system 40 of the second embodiment, but uses a third variable filter 26 whose pass band is varied in order to remove an unnecessary wave other than the reception signal Rx in which only the reception signal Rx is used as a pass band in simple manner. Accordingly, the third variable filter 26 is used to implement a canceller at the reception side in the third embodiment.

Thus, the receiver 20a includes a low noise amplifier 18 connected to the third variable filter, for low-noise-amplifying the reception signal Rx, and a second variable filter 17 connected to the low noise amplifier, whose pass band is varied in order to remove an unnecessary wave other than the reception signal Rx in which only the reception signal Rx is used as a pass band.

Meanwhile, the transmitter 10a includes a first variable filter 11 and a power amplifier 12 as in the second embodiment. Also, since the second canceller 16a and the circulator 14 are configured in the same manner as that of the second embodiment, the detailed description thereof will be omitted.

The transmitter/receiver combination system 40a in the third embodiment includes a second canceller 16a, the circulator 14 and the third variable filter 26.

In the following, the operation of the third embodiment will be described with reference to the specific signal level. First, at the receiver side, the reception signal Rx received in the antenna 15 passes through the circulator 14, in which case at maximum 0.8 dB is attenuated. In the third variable filter 26, an unnecessary wave other than the reception signal Rx is removed, in which at maximum 3 dB is attenuated. Thus, a total attenuation loss is 3.8 dB. The loss of about 4.5 dB or so occurs including a cable assembly loss.

Thereafter, a low noise amplification is accomplished with respect to the reception signal Rx, and then a clean reception signal Rx is obtained while passing through the second variable filter 17 which removes the unnecessary wave other than the reception signal Rx.

Thus, if the power of the transmission signal Tx radiated from the antenna 15 is 10 W, that is, 40 dBm, at least 15 dB is attenuated due to the separation of the circulator 14 and the attenuated signal is transferred to the third variable filter 26 for filtering the reception signal. The power of the transmission signal applied to the third variable filter is about 25 dBm which corresponds to not more than 0.5 W. As a result, the third embodiment can implement the receiver 20a using a low power variable filter.

Meanwhile, at the transmission side, as in the second embodiment, the transmission signal Tx passes through the first variable filter 11 and the power amplifier 12. Then, the transmission signal Tx passes through the circulator 14 and transferred to the antenna 15 in the state where the noise signal Nx of the reception band is attenuated by 40 dB or more in the second canceller 16a, and part of the transmission signal Tx is additionally attenuated by 15 dB or more in the circulator 14 and input to the reception side.

Conclusively, the third embodiment also performs a signal processing at the reception side in the state where the noise signal Nx of 40 dB or more is attenuated as in the second embodiment, to thereby obtain the reception signal Rx with a high separation degree.

In a particular case such as a secret conversation communication, the third embodiment of the present invention varies the band pass frequencies of the first through third variable filters 11, 17, and 26 installed in the transmitter/receiver 10a and 20a and the canceller 16a and the band rejection frequencies of the second variable band rejection filters 24a, to thereby vary the transmission/reception frequencies. Further, the third embodiment of the present invention can be applied even in the case that the transmission/reception frequencies are inverted.

Figure 6:
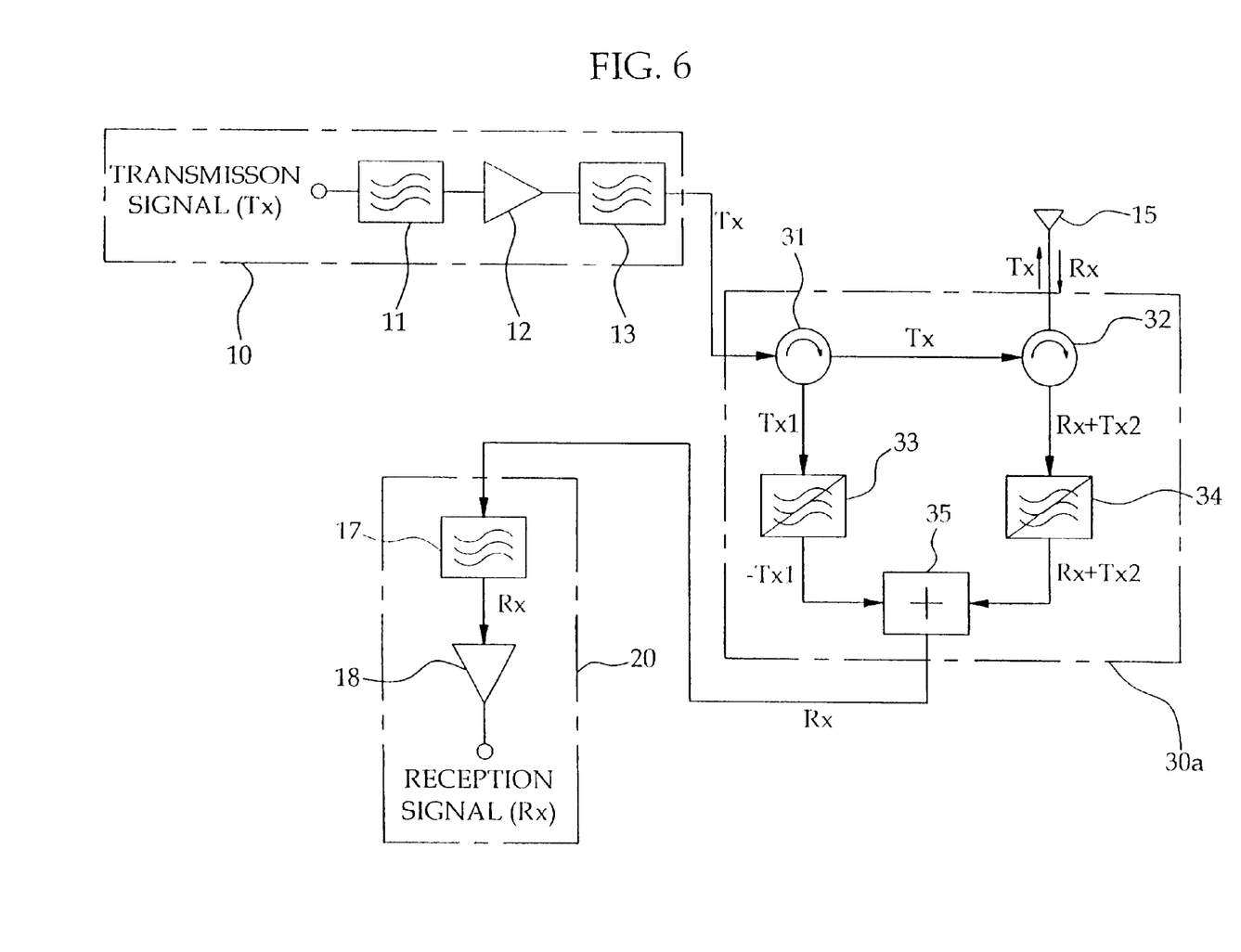
FIG. 6 is a block diagram schematically showing a RF front-end portion including a transmitter/receiver combination system using a double stage circulator according to a fourth embodiment of the present invention.

FIG. 6 is a block diagram schematically showing a RF front-end portion including a transmitter/receiver combination system using a double stage circulator according to a fourth embodiment of the present invention.

The transmitter/receiver combination system 30a using a double stage circulator according to a fourth embodiment of the present invention, plays a role of coupling a transmitter 10 including a variable filter 11, a power amplifier 12, a harmonic filter 13, and a receiver 20 including a variable filter 17 and a low noise amplifier 18 with a common antenna 15.

The combination system 30a includes first and second circulators 31 and 32, first and second pads 33 and 34 and a power divider 35.

In the combination system 30a, the first and second circulators 31 and 32 are connected in series in the form of a double stage between the transmitter 10 and the antenna 15. Accordingly, the transmission signal Tx passes through the first and second circulators 31 and 32 and transferred to the antenna 15 without causing a signal loss, to then be radiated in the air via the antenna 15.

Also, the first and second pads 33 and 34 are connected at each remaining output end of the first and second circulators 31 and 32. The outputs of the first and second pads 33 and 34 are connected to the power divider 35 and the output of the power divider 35 is connected to the variable filter 17 in the receiver 20a.

To the first and second pads 33 and 34 are input transmission signals Tx1 and Tx2 whose magnitudes are same or similar but powers are attenuated by 20 dB or so, via each remaining output end of the first and second circulators 31 and 32. Also, the feeble reception signal Rx received via the antenna 15 is applied to the second pad 34 together with the attenuated transmission signal Tx2 via the second circulator 32.

The first and second pads 33 and 34 include an attenuator and a delay line, or a delay line filter, respectively, and process the first and second transmission signals Tx1 and Tx2 into signals whose magnitudes are same but phases are inverted by 180°, respectively and transfer the same to the power divider 35. In this case, it is preferable that an attenuator and a delay are provided in the first pad 33 in order to avoid the attenuation of the reception signal Rx, with a result that the input first transmission signal Tx1 is set a signal whose magnitude is same as the second transmission signal Tx2 and phase differs by 180°.

Thus, two transmission signals are cancelled in the power divider 35 which plays a role of a signal coupler due to the input two transmission signals −Tx1 and Tx2 whose magnitudes are same but phases are inverted with each other. As a result, only the feeble reception signal Rx passes through the power divider 35 and input to the receiver 20, smoothly.

As a result, the combination system 30a of the present invention does not affect transmission/reception of the signal, but has an advantage of effectively canceling the high power transmission signal Tx input to the receiver 20. Thus, the reception signal Rx of the power divider 35 in the combination system 30a passes through the variable filter 17 and the low noise amplifier 18 in the receiver 20 in sequence and can amplify a clean reception signal Rx without having any noise.

In a particular case such as a secret conversation communication, the combination system 30a of the fourth embodiment according to the present invention varies the band pass frequencies of the variable filters 11 and 17 installed in the transmitter/receiver 10 and 20 and the first and second pads 33 and 34, to thereby vary the transmission/reception frequencies. Further, the fourth embodiment of the present invention can be applied even in the case that the transmission/reception frequencies are inverted. That is, the combination system 30a can be applied even to the case where any transmitter and receiver are combined as in the variation and inversion of the transmission/reception frequencies.

As described above, the present invention can be effectively used in a frequency varying system where a transmission/reception band frequency is variable and furthermore a transmission/reception band frequency is inverted. In the case other than a frequency varying system, the present invention can be applied at lower cost and more excellent performance, than those in comparison with an existing system using a duplexer having large volume, high cost and large loss.

The present invention provide a transmission/reception band combination method using a circulator, having an advantage having a loss characteristic lower than the duplexer, and remarkably improving an electrical separation degree of the transmitter/receiver which raises a problem due to the combination method using the existing circulator.

In the first through third embodiments, a single canceller has been provided at the transmission side and/or the reception side. However, as in the fourth embodiment, the cancellers of a double stage are connected in series at the transmission/reception sides, to thereby remove the transmission signal input to the receiver more perfectly.

Also, the combination system forms a single branch to remove a transmission signal. As necessary, a proper number of branches are formed, to thereby remove all unnecessary signals including a center signal and harmonic wave signals, which is apparent to a person skilled in the art.

As described above, the present invention generates an inverted transmission signal having the same magnitude and a 180° phase difference as and from that of a transmission signal which is input to a receiver together with a reception signal. As a result, the frequency separation degree of the transmitter/receiver can be enhanced and simultaneously a coupling loss is small and the volume and cost of the product can be lowered, due to the recombination and canceling.

Further, the present invention effectively the high power transmission signal input to the receiver, to thereby use a low power variable filter. Accordingly, the sufficient separation degree of the transmitter/receiver can be obtained even in the case that the transmission/reception frequency is variable and the band of the transmission/reception frequency is inverted as in a secret conversation communication.

Also, the transmission signal input to the receiver can be cancelled in the state where the noise signal of the reception band is attenuated by the canceller provided in the transmitter, to thereby obtain a reception signal Rx while having a high separation degree.

As described above, the particular preferred embodiments according to the present invention have been described. However, the present invention is not limited to the above-described embodiments, but there may be various modifications and changes by one who has an ordinary skill in the art without departing off the technical sprit of the present invention.

What is claimed is:

1. A transmitter/receiver combination system for combining a transmitter and a receiver into a single antenna in a wireless communication system, the transmitter/receiver combination system comprising:

a circulator for receiving a transmission signal Tx from the transmitter, transmitting the received transmission signal to an antenna without causing a signal loss, and transmitting a reception signal Rx received from the antenna to other ends without causing a signal loss; and at least one transmission signal canceller for dividing the transmission signal Tx input in an attenuated form as much as a predetermined magnitude via the circulator together with the reception signal Rx into at least two paths, producing two phase inverted transmission signals (−Tx, Tx) with the same magnitude and delay time as those of the incoming transmission signal, and recombining the produced two transmission signals with each other, to thereby canceling the transmission signal Tx and transmitting only the reception signal Rx to the receiver.

2. The transmitter/receiver combination system of claim 1, wherein said transmission signal canceller comprises:

a first coupler for attenuating a part of the transmission/reception signal Tx+Rx which is input to the transmission signal canceller to branch the same and simultaneously performing a 90° phase delay;

a first variable band rejection filter for canceling the reception signal Rx and passing through only a transmission signal Tx with respect to a low power transmission/reception signal Tx+Rx which has been branched via the first coupler;

a signal amplifier for amplifying the transmission signal Tx of the first variable band rejection filter into the same magnitude as that of the transmission signal Tx;

phase delay means for delaying a time so that the transmission/reception signal Tx+Rx unbranched in the first coupler is consistent with the inverted signal of the branched transmission signal Tx; and a second coupler for 90° phase delaying the output signal of the signal amplifier additionally, and recombining the phase delayed result with the output signal Tx+Rx of the phase delay means, to thereby offset the unbranched transmission signal Tx with the phase inverted transmission signal −Tx and output only the reception signal Rx.

3. The transmitter/receiver combination system of claim 1, wherein said transmitter comprises a first variable filter for varying a pass band of a transmission signal Tx by several thousand number of times per second and transferring the varied result to a next stage, a power amplifier for large-scale power amplifying the output of the first variable filter, and a harmonic filter for removing a harmonic component included in a power-amplified transmission signal, and wherein said receiver comprises a second variable filter whose pass band is varied in order to remove an unnecessary wave other than the reception signal Rx, in which its pass band is set to only the reception signal Rx output from the canceller, and a low noise amplifier for low-noise-amplifying the received feeble reception signal Rx.

4. The transmitter/receiver combination system of claim 2, further comprising at least one noise signal attenuation means disposed between the transmitter and the circulator for generating a signal together with the transmission signal Tx from the transmitter and attenuating only a noise signal Nx of a reception band input to the receiver.

5. The transmitter/receiver combination system of claim 4, wherein said noise signal attenuation means comprises:

a third coupler for branching a portion of the noise signal Nx and the transmission signal Tx amplified together with the transmission signal Tx and for phase delaying the branched signal by 90°;

a second variable band rejection filter for rejecting the transmission signal Tx and passing only the noise signal Nx with respect to the low power transmission/noise signal (Tx+Nx) branched via the third coupler;

a signal amplifier for amplifying the noise signal Nx from the second variable band rejection filter into the same magnitude of that of the unbranched noise signal Nx;

a harmonic cancel/delay line filter for making the transmission/noise signal Tx+Nx unbranched from the third coupler have the same delay as that of the branched noise signal Nx and simultaneously canceling harmonic components, and a fourth coupler for additionally phase delaying the output signal Nx of the signal amplifier by 90° and recombining the phase delayed result with the output signal Tx+Nx from the harmonic cancel/delay line filter, to thereby offset the unbranched noise signal Nx and the phase inverted noise signal −Nx with each other, and thus output only a desired large power transmission signal Tx to the circulator.

6. The transmitter/receiver combination system of claim 5, wherein the transmission/reception frequencies of the transmission/reception signals, and the rejection bands of the first and second variable band rejection filters are varied.

7. The transmitter/receiver combination system of claim 5, wherein the transmission/reception frequencies of the transmission/reception signals are inverted with each other.

8. A transmitter/receiver combination system for combining a transmitter and a receiver into a single antenna in a wireless communication system, the transmitter/receiver combination system comprises:

noise signal attenuation means connected to the output of the transmitter, for attenuating only a noise signal of a reception band generated together with a transmission signal from the transmitter;

a circulator for receiving the transmission signal from the noise signal attenuation means, transmitting the received signal to an antenna without causing a signal loss, and transmitting the reception signal received from the antenna to other ends without causing a signal loss; and a first variable filter for canceling the transmission signal input in an attenuated form as much as a predetermined magnitude via the circulator together with the reception signal and transmitting only a reception signal to the receiver.

9. The transmitter/receiver combination system of claim 8, wherein said receiver comprises:

a low noise amplifier for low noise amplifying the feeble reception signal received in the first variable filter; and a second variable filter whose pass band is varied in order to remove an unnecessary wave other than the reception signal, in which only the reception signal becomes a pass band.

10. A transmitter/receiver combination system for combining a transmitter and a receiver into a single antenna in a wireless communication system, the transmitter/receiver combination system comprising:

a first circulator for receiving an original transmission signal from the transmitter, and transmitting the received transmission signal to a next stage without causing a signal loss;

a second circulator for receiving the transmission signal from the first circulator, transmitting the received signal to an antenna without causing a signal loss, and transmitting the reception signal received from the antenna to other ends without causing a signal loss;

a first pad and a second pad for receiving a first transmission signal input in an attenuated form as much as a predetermined magnitude via the other end of the first circulator and a second transmission signal input in an attenuated form as much as a predetermined magnitude via the other end of the second circulator, and for converting the first and second transmission signals into two transmission signals whose magnitudes are same and phases are inverted, respectively; and signal combination means for combining the output signals of the first and second pads, canceling the first and second transmission signals and transmitting only the reception signal to the receiver.

11. The transmitter/receiver combination system of claim 10, wherein said at least one of the first and second pads comprises: an attenuator for attenuating the magnitude of a transmission signal in the same magnitude as that of the other transmission signal; and phase delay means for delaying the phase of the signal in order to have a 180° phase difference with respect to the other transmission signal.

12. The transmitter/receiver combination system of claim 11, wherein said phase delay means is provided in the first pad.

13. The transmitter/receiver combination system of claim 10, wherein said transmitter comprises a first variable filter for varying a pass band of a transmission signal by several thousand number of times per second and transferring the varied result to a next stage, a power amplifier for large-scale power amplifying the output of the first variable filter, and a harmonic filter for removing a harmonic component included in a power-amplified transmission signal, and wherein said receiver comprises a second variable filter whose pass band is varied in order to remove an unnecessary wave other than the reception signal, in which only the reception signal Rx output from the canceller becomes a pass band, and a low noise amplifier for low-noise-amplifying the received feeble reception signal.

14. A front-end for use in a wireless communication system:

a first variable filter for varying a pass band of a transmission signal Tx by several thousand number of times per second and transferring the varied result to a next stage;

a power amplifier for large-scale power amplifying the output of the first variable filter;

a harmonic filter for removing a harmonic component included in a power-amplified transmission signal;

a circulator for receiving the transmission signal via a first end, transmitting the received transmission signal to a second end, and transmitting a reception signal Rx received from the second end to a third end without causing a signal loss;

a transmission/reception common antenna connected to the second end of the circulator, radiating the transmission signal Tx in the air and receiving the reception signal to be transferred to the circulator;

at least one transmission signal canceller for dividing the transmission signal input in an attenuated form as much as a predetermined magnitude via the circulator together with the reception signal into at least two paths, producing two phase inverted transmission signals (−Tx, Tx) with the same magnitude and delay time as those of the incoming transmission signal, recombining the produced two transmission signals with each other, to thereby canceling the transmission signal and transmitting only the reception signal to the receiver;

a second variable filter whose pass band is varied in order to remove an unnecessary wave other than the reception signal Rx, in which only the reception signal Rx output from the canceller becomes a pass band; and a low noise amplifier for low-noise-amplifying the received feeble reception signal Rx.

15. The front-end for use in a wireless communication system of claim 14, further comprising noise signal attenuation means for generating a signal together with the transmission signal from the transmitter disposed between the transmitter and the circulator and attenuating only a noise signal of a reception band input to the receiver.

16. The front-end for use in a wireless communication system of claim 14, wherein the transmission/reception frequencies of the transmission/reception signals, and the pass bands of the first and second variable filters are varied.

17. A front-end for use in a wireless communication system:

a first variable filter for varying a pass band of a transmission signal by several thousand number of times per second and transferring the varied result to a next stage;

a power amplifier for large-scale power amplifying the output of the first variable filter;

a harmonic filter for removing a harmonic component included in a power-amplified transmission signal;

a first circulator for receiving the transmission signal from the harmonic filter, and transmitting the received transmission signal to a next stage, without causing a signal loss;

a second circulator for receiving the transmission signal from the first circulator, transmitting the received signal to an antenna without causing a signal loss, and transmitting the reception signal received from the antenna to other ends without causing a signal loss;

a first pad and a second pad for receiving a first transmission signal input in an attenuated form as much as a predetermined magnitude via the other end of the first circulator and a second transmission signal input in an attenuated form as much as a predetermined magnitude via the other end of the second circulator, and for converting the first and second transmission signals into two transmission signals whose magnitudes are same and phases are inverted, respectively;

signal combination means for combining the output signals of the first and second pads, canceling the first and second transmission signals and transmitting only a reception signal to a receiver;

a second variable filter whose pass band is varied in order to remove an unnecessary wave other than the reception signal, in which only the reception signal output from the signal combination means becomes a pass band; and a low noise amplifier for low-noise-amplifying the received feeble reception signal.

18. A transmission signal canceling method in a transmitter/receiver combination system for combining a transmitter and a receiver into a single antenna in a wireless communication system, the transmission signal canceling method comprising the steps of:

(a) receiving an original transmission signal from the transmitter, transmitting the received transmission signal to an antenna via a first path without causing a signal loss, and transmitting a reception signal received from the antenna via a second path;

(b) 90° phase delaying for delaying part of the transmission signal the reception signal input to the receiver in an attenuated form as much as a predetermined magnitude via the second path and branching the phase delayed result into a third path;

(c) canceling the reception signal among the transmission signal the reception signal which branched via the third path, and amplifying the transmission signal in the same magnitude as that of the second path;

(d) delaying the transmission signal and the reception signal of the unbranched second path to have a phase difference of 180° from the transmission signal of the branched third path; and (e) combining the phase inverted transmission signal of the third path with the phase delayed transmission signal and the reception signal of the second path, canceling the transmission signal and transmitting only a reception signal to the receiver.

19. The transmission signal canceling method of claim 18, further comprising the step of (f) generating a signal together with the transmission signal before the step (a) and attenuating only the noise signal of the reception band input to the receiver.

20. A transmission signal canceling method in a transmitter/receiver combination system for combining a transmitter and a receiver into a single antenna in a wireless communication system, the transmission signal canceling method comprising the steps of:

(a) transmitting a transmission signal received from the transmitter, via a first path without causing a signal loss and generating a first transmission signal which has been attenuated as much as a predetermined magnitude via a second path;

(b) transmitting the received transmission signal to an antenna without causing a signal loss, and transmitting the reception signal received from the antenna to a third path without causing a signal loss;

(c) receiving the first transmission signal via the second path, and a second transmission signal input in an attenuated form as much as a predetermined magnitude via the third path by the transmission signal together with the reception signal, and converting the first and second transmission signals into two transmission signals whose magnitudes are same and phases are inverted; and (d) combining the outputs of the second and third paths so that the first and second transmission signals are cancelled.

* * * * *